United States Patent
Kroner et al.

(10) Patent No.: US 6,855,762 B1
(45) Date of Patent: Feb. 15, 2005

(54) METHOD FOR PRODUCING WATER SOLUBLE POLYMER OF ESTERS FROM ETHYLENICALLY UNSATURATED CARBOXYLIC ACIDS AND POLYALKYLENE GLYCOLS

(75) Inventors: Matthias Kroner, Eisenberg (DE); Karl-Heinz Büchner, Altlussheim (DE); Johannes Perner, Neustadt (DE); Hans-Jürgen Raubenheimer, Ketsch (DE); Dieter Faul, Niederkirchen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 247 days.

(21) Appl. No.: 10/130,611

(22) PCT Filed: Nov. 16, 2000

(86) PCT No.: PCT/EP00/11343

§ 371 (c)(1),
(2), (4) Date: May 21, 2002

(87) PCT Pub. No.: WO01/40337

PCT Pub. Date: Jun. 7, 2001

(30) Foreign Application Priority Data

Nov. 27, 1999 (DE) ......................................... 199 57 177

(51) Int. Cl.$^7$ ............................................. C08L 33/00
(52) U.S. Cl. ................. 524/558; 526/303.1; 526/320; 526/318.2; 526/291; 526/318.41; 526/319; 526/323; 526/330; 526/345; 526/338; 526/347; 560/198; 560/199; 560/205; 560/212; 560/218; 524/801; 524/832
(58) Field of Search .................................. 524/558, 801, 524/832; 526/303.1, 320, 318.2, 291, 319, 323, 330, 338, 345, 347, 318.44; 560/198, 199, 205, 212, 218

(56) References Cited

U.S. PATENT DOCUMENTS

| 4,138,381 A |   | 2/1979 | Chang et al. |
| 4,429,097 A |   | 1/1984 | Chang et al. |
| 6,166,112 A | * | 12/2000 | Hirata et al. ................... 524/5 |

FOREIGN PATENT DOCUMENTS

EP 0 884 290 12/1998

* cited by examiner

Primary Examiner—Tatyana Zalukaeva
(74) Attorney, Agent, or Firm—Oblon, Spivak, McClelland, Maier & Neustadt, P.C.

(57) ABSTRACT

A process for the preparation of water-soluble polymers of esters of ethylenically unsaturated carboxylic acids and polyalkylene glycols by azeotropic esterification, in the presence of organic solvents which form an azeotrope with water, of ethylenically unsaturated carboxylic acids with polyalkylene oxides which are capped at one end by end groups, to a degree of at least 85 wt %, followed by free-radical polymerization of the resulting esters optionally together with other ethylenically unsaturated monomers, in aqueous medium, wherein the organic solvents are removed by azeotropic distillation from the reaction mixture during polymerization and the water that is removed by distillation is recycled or the quantity of water removed by distillation from the reaction mixture is replaced by a feed of fresh water.

10 Claims, No Drawings

METHOD FOR PRODUCING WATER SOLUBLE POLYMER OF ESTERS FROM ETHYLENICALLY UNSATURATED CARBOXYLIC ACIDS AND POLYALKYLENE GLYCOLS

The invention relates to a process for the preparation of water-soluble polymers of esters of ethylenically unsaturated carboxylic acids and polyalkylene glycols by azeotropic esterification, in the presence of organic solvents which form an azeotrope with water, of ethylenically unsaturated carboxylic acids with polyalkylene glycols which are capped at one end by end groups, to a degree of at least 85 wt %, followed by free-radical polymerization of the resulting esters optionally together with other unsaturated monomers, in aqueous medium.

The aforementioned process for the preparation of water-soluble polymers of esters of ethylenically unsaturated carboxylic acids and polyalkylene oxides by azeotropic esterification followed by polymerization of the monomers is disclosed in EP-A 0,884,290. Azeotropic esterification achieves high conversion rates. The entrainer used is removed prior to polymerization of the monomers. Distillation of the organic solvent from the mixture formed during esterification is time-consuming. Besides, unconverted ethylenically unsaturated carboxylic acid such as methacrylic acid is removed azeotropically from the reaction mixture during this operation.

It is an object of the present invention to increase the space-time yield in the above process and to provide polymers which exhibit a low residual content of organic solvent.

This object is achieved according to the invention by a process for the preparation of water-soluble polymers of esters of ethylenically unsaturated carboxylic acids and polyalkylene oxides by azeotropic esterification, in the presence of organic solvents which form an azeotrope with water, of ethylenically unsaturated carboxylic acids with polyalkylene oxides which are capped at one end by end groups, to a degree of at least 85 wt %, followed by free-radical polymerization of the resulting esters optionally together with other ethylenically unsaturated monomers, in aqueous medium, when the organic solvents are removed by azeotropic distillation from the reaction mixture during polymerization and the water that is removed by distillation is recycled or the quantity of water removed by distillation from the reaction mixture is replaced by a feed of fresh water.

The content of organic solvent in the monomer solution can be up to 30 wt %. Alternatively, a portion of the solvent may be removed from the reaction mixture following esterification such that the content of organic solvent in the monomer solution is from 1 to 5 wt %.

Suitable ethylenically unsaturated carboxylic acids contain for example from 3 to 10 carbon atoms. They are esterified azeotropically in the first process step. Suitable ethylenically unsaturated carboxylic acids are for example acrylic acid, methacrylic acid, crotonic acid, vinylacetic acid, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicyclo[2,2,2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, fumaric acid and citraconic acid.

Preferably used ethylenically unsaturated carboxylic acids are acrylic acid, methacrylic acid, maleic acid, maleic anhydride and fumaric acid.

The azeotropic esterification of the monoethylenically unsaturated carboxylic acids with the polyalkylene glycols terminated at one end by end groups is carried out in the presence of organic solvents which form an azeotrope with water, by known methods. The organic solvents are also referred to as entrainers. During azeotropic esterification the water of reaction is removed azeotropically from the reaction mixture and esterification is carried on at least until a conversion of 85%, preferably of at least 90%, based on the polyethylene glycols capped at one end, is achieved. The conversion can be monitored during this operation with reference to the drop in the acid value or with reference to the drop in the hydroxyl value of the alkyl poly(alkylene glycol)s. Besides, it is possible, following polymerization, to ascertain by GPC analysis the unesterified content of alkyl poly(alkylene glycol)s in addition to the polymer.

The alkyl poly(alkylene glycol)s used can be eg compounds of the general formula

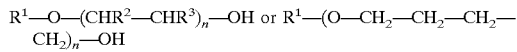

in which $R^1$ denotes $C_1$–$C_{50}$ alkyl or $C_1$–$C_{18}$ alkylphenyl $R^2$ denotes H, $C_1$ or $C_2$ alkyl $R^3$ denotes H, $C_1$ or $C_2$ alkyl and n is from 2 to 300.

The molecular weight of the alkyl poly(alkylene glycol)s can be up to 10,000, while molecular weights of from 100 to 2 000 are preferred. The number of alkylene glycol units in the compounds of formulae I and II is usually up to 230, whilst preferably from 3 to 40 alkylene oxide units are present per molecule.

Examples of specific alkyl poly(alkylene glycol)s are methyl polyethylene glycol having a molecular weight of 350 methyl polyethylene glycol having a molecular weight of 500 methyl polyethylene glycol having a molecular weight of 750 methyl polyethylene glycol having a molecular weight of 1000 methyl polyethylene glycol having a molecular weight of 1500 methyl polyethylene glycol having a molecular weight of 2000 methyl polyethylene glycol having a molecular weight of 4000 methyl polyethylene glycol having a molecular weight of 10,000

The methyl poly(alkylene glycol)s can also contain units of propylene oxide or butylene oxide together with units of ethylene oxide. The combinations can be arranged in blocks or distributed randomly. Examples thereof are methyl poly(alkylene glycol)s which are obtainable by the addition of ethylene oxide and 1 mol of propylene oxide to 1 mol of methanol or by the reaction of 5 mol of ethylene oxide and 3 mol of propylene oxide or 5 mol of ethylene oxide and 10 mol of propylene oxide 10 mol of ethylene oxide and 1 mol of propylene oxide 10 mol of ethylene oxide and 3 mol of propylene oxide 10 mol of ethylene oxide and 10 mol of propylene oxide 20 mol of ethylene oxide and 1 mol of propylene oxide 20 mol of ethylene oxide and 3 mol of propylene oxide 20 mol of ethylene oxide and 10 mol of propylene oxide
25 mol of ethylene oxide and 1 mol of propylene oxide
25 mol of ethylene oxide and 3 mol of propylene oxide
25 mol of ethylene oxide and 10 mol of propylene oxide with 1 mol of methanol, ethanol, n-propanol, isopropanol or butanol respectively.

It is also possible to use partially etherified polytetrahydrofuran carrying as terminal group at one end an alkyl group, preferably a $C_1$–$C_4$ alkyl group.

Esterification is carried out such that the molar ratio of unsaturated carboxylic acids to alkyl poly(alkylene glycol) is from 1:1 to 10:1 and preferably from 1:1 to 5:1. Excess carboxylic acid can remain in the esterification mixture. If required, it can be removed therefrom by distillation or extraction.

For the esterification it may be advantageous to use a catalyst, but it can also be carried out without the use of a catalyst. Alternatively, it may be advantageous to carry out esterification in the absence of a catalyst, because polyalkylene glycols are cleaved by acids and the cleavage products can lead to undesirable side reactions.

As catalyst there may be used all organic and inorganic acids. Examples are sulfuric acid, sulfurous acid, disulfuric and polysulfuric acids, sulfur trioxide, methanesulfonic acid, benzenesulfonic acid, p-toluenesulfonic acid, $C_2$–$C_{30}$ alkylbenzenesulfonic acids, sulfuric acid monoesters of $C_1$–$C_{30}$ alcohols, sulfuric acid monoesters of alkyl poly(alkylene glycol)s, phosphoric acid, phosphorous acid, hypophosphorous acid, polyphosphoric acid, hydrochloric acid, perchloric acid and acid ion exchangers.

The amount of catalyst based on the total reaction mixture is for example from 0 to 10 wt %, preferably from 0.05 to 7 wt % and more preferably from 0.1 to 5 wt %.

Organic solvents that are suitable for use as entrainers are aliphatic, cycloaliphatic, isoaliphatic, linear aliphatic, aliphatic-aromatic and purely aromatic hydrocarbons. The boiling points of the entrainers are, for example, between 60° and 300° C. and preferably between 70° and 150° C. Industrial mixtures of different entrainers may be used. Such mixtures often create a boiling range. Such mixtures are also referred to as special boiling-point gasolines, petroleum benzine, special boiling-point spirits, naphtha or petroleum ether fractions. Such mixtures often occur as a refinery fraction. They can be made to measure from steam cracked olefins by oligomerizations and hydrogenations.

Examples of such special boiling-point spirits are eg gasolines boiling between 90° C. and 100° C., between 100° C. and 140° C. or between 140° C. and 160° C.

They are usually alkane blends.

The fractions can contain, depending on their source, purely n-aliphatic, isoaliphatic, aliphatic-aromatic or purely aromatic constituents.

Suitable entrainers comprise all hydrocarbon mixtures. An overview of the commercially available hydrocarbon mixtures is given, for example, in Kirk-Othmer, Encyclopedia of Chemical Technology, 1995, Vol. 13, pages 744 et seq, chapter entitled Hydrocarbons, or ibid. Vol. 12, pages 126 et seq, chapter entitled Fuels, and Vol. 12, pages 341 et seq. chapter entitled Gasoline. A further overview of hydrocarbon mixtures is given in Ullmann's Encyclopedia of Industrial Chemistry, 1989 Vol. A 13, pages 227–281 in the chapter entitled Hydrocarbons, and also ibid. in Vol. A 16, pages 719–755 in the chapter entitled Motor Fuels.

The entrainers form together with water an azeotropic mixture, which usually possesses a boiling point below that of the lower-boiling constituent. The boiling points of the azeotropic mixtures are for example very preferably between 70° C. and 130° C.

Examples of entrainers are n-paraffins such as hexane, decane, undecane, dodecane, octadecane, isoparaffins such as isooctane, isodecane, isododecane, isohexadecane, isooctadecane, cycloparaffins such as cyclohexane, methylcyclohexane, dimethylcyclohexane, aromatics such as benzene, toluene, o-, m- or p-xylene, xylene mixtures, trimethylbenzene, tetramethylbenzene, mesitylene, ethylbenzene, isopropylbenzene, n-butylbenzene and isobutylbenzene. Preference is given to cyclohexane, methylcyclohexane, toluene, xylene mixtures and o-xylene. Particular preference is given to toluene. The content of entrainer in the reaction mixture is from 5 to 50 wt %, preferably from 10 to 25 wt %, based on the total weight of unsaturated carboxylic acid and alkyl poly(alkylene glycol).

In accordance with the invention, the content of entrainer in the reaction mixture is such that the entrainer in the reaction mixture possesses a boiling point of from 100 to 150° C., preferably between 110 and 140° C. The boiling points of the azeotropes and entrainers in the mixture are mostly higher than those of the pure substances.

In order to protect the polyalkylene glycol capped at one end by end groups from oxidative degradation during the esterification, there may be present reducing agents in amounts of up to 5 wt %, preferably of up to 2 wt %, based on the reaction mixture. Examples of the reducing agents used are phosphorus derivatives such as hypophosphorous acid, phosphorous acid, sulfur dioxide, thiosulfate and/or dithionite. However, it is possible to do without reducing agents if desired.

In order to prevent premature polymerization of the unsaturated acids and their esters, there are used conventional polymerization inhibitors such as phenothiazine, hydroquinone monomethyl ether or di-tert-butyl-p-cresol. The amounts of inhibitors used are for example 0.001 to 2 wt % and preferably 0.005 to 0.5 wt %.

Esterification is carried out at temperatures of from 80° to 200° C. for example. Preference is given to temperatures of from 90 to 170° C., more preferably from 110 to 140° C.

Nitrogen is usually used for inertization.

If for example a stream of nitrogen is passed through the reaction mixture during esterification, distillation of the azeotrope is improved. For example, nitrogen is passed through the esterification mixture at a rate corresponding to preferably from 0.1 to 5 times and more preferably from 0.5 to 2 times the capacity of the reactor, per hour.

The azeotrope is condensed in a heat exchanger and separated in a phase separator into an upper organic phase and a lower aqueous phase. The use of an appropriate pipe system causes the upper organic phase to be recycled to the esterification reactor.

The progress of the esterification can be monitored by determining the quantity of water formed and/or by titrimetrically determining the acid value of the reaction mixture on samples thereof. Esterification is run until the acid value no longer falls or the amount of water no longer increases. Depending on the degree of alkoxylation different times are required to achieve this end. The higher the degree of alkoxylation, the longer the esterification times required. For example, when 17 wt % of toluene is used as entrainer at 130° C., the following esterification times are required in order to acquire a conversion of at least 85%:

| Alkyl poly(alkylene glycol) | Esterification time in hours |
| --- | --- |
| Methyl polyethylene glycol having a molar mass of 350 | 4 |
| Methyl polyethylene glycol having a molar mass of 500 | 5 |
| Methyl polyethylene glycol having a molar mass of 750 | 7 |
| Methyl polyethylene glycol having a molar mass of 1000 | 8 |
| Methyl polyethylene glycol having a molar mass of 2000 | 12 |

On completion of esterification the entrainer remains in the reaction mixture or is removed by distillation to a residual content of 1–5 wt %. In a preferred embodiment the entrainer is not removed and the esterification products, containing ca from 10 to 30 wt % of entrainer, are stored in a storage tank until use in the polymerization. Storage may be carried out at from 10° to 50° C. under a blanket of nitrogen or nitrogen/air mixtures. The mixture is readily pumpable and possesses eg at 30° C. a viscosity of ca 30 mPa.s and at 60° C. a viscosity of ca 15 mPa.s. The crystallization temperature of the ester is lowered by the entrainer, so that storage at lower temperatures is possible. The lower the storage temperature, the longer the possible storage time for the ester.

Suitable apparatus comprises for example all conventionally employed distillation devices, for example stirred-tank reactors, pot stills with and without recirculation, film evaporators, falling-film evaporators or shell-and-tube evaporators. Execution of the esterification under reduced pressure, eg under a pressure of from 1 to 900 mbar, is often helpful, in order to reduce the thermal load on the esterification product. If highly efficient evacuating equipment is used, such as, for example, straight-lobe compressors or rotary-gate valve pumps, the pressure can be reduced to ca 1 mbar. Using other evacuating equipment, for example steam-jet pumps or water-ring pumps, there are achieved pressures of from 10 to 100 mbar.

The content of entrainer in the reaction mixture obtained following esterification of the carboxylic acids can be lowered relatively quickly to a concentration of ca from 1 to 5 wt % by distillation of the entrainer. On the other hand the complete separation of the entrainer from the reaction mixture formed during esterification using straight-run distillation is very time-consuming and does not produce quantitative yields. Since the entrainers do not interfere with polymerization, small amounts of entrainer can remain in the monomer and be removed some time later. Polymerization of the esterification product is carried out in aqueous medium. Preferably polymerization is carried out in pure water or mixtures of water and $C_1$–$C_4$ alcohols are used. The concentration of the polymers in the aqueous solution is for example from 20 to 70 wt % and preferably from 30 to 50 wt %.

In the process of the invention copolymers of esters of ethylenically unsaturated carboxylic acids and polyalkylene glycols that are terminated at one end by end groups are very preferably prepared. Such copolymers are used for example as dispersing agents for inorganic solids and are particularly useful as concrete liquefiers. In the copolymerization there are preferably used (a) esters of the formula

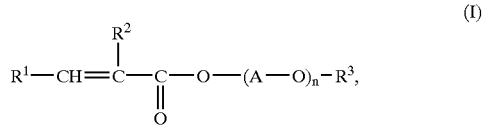

in which
$R^1$, $R^2$ are the same or different and denote H or $CH_3$
A is an alkylene group containing from 2 to 4 carbons or is —$CH_2$—$CH_2$—$CH_2$—$CH_2$—,
$R^3$ stands for $C_1$–$C_{50}$ alkyl or $C_1$–$C_{18}$ alkylphenyl and n is a number from 2 to 300,
and b) at least one monoethylenically unsaturated carboxylic acid or salts thereof. The monomers (a) and (b) are copolymerized preferably in a ratio, by weight, of from 98:2 to 2:98. Of special interest here is the copolymerization of a) acrylates or methacrylates of polyalkylene glycols terminated at one end by $C_1$–$C_4$ alkyl end groups and having molecular weights of from 100 to 10 000 and b) acrylic acid and/or methacrylic acid.

Of particular industrial significance is the preparation of copolymers of (a) esters of methacrylic acid and methyl polyethylene glycol having molecular weights of from 100 to 10 000 and (b) methacrylic acid.

As polymerization initiators there can be used all known water-soluble peroxo and azo initiators. Particularly preferred polymerization initiators are hydrogen peroxide and also sodium, potassium and ammonium peroxodisulfates. The amounts of initiators used are for example from 0.1 to 10 wt % and preferably from 0.5 to 5 wt % based on the monomers used for the polymerization.

The molecular weight of the polymers can be selectively controlled by means of polymerization regulators. As polymerization regulators there are used for example water-soluble sulfur, nitrogen and phosphorus compounds. Examples of polymerization regulators are sodium hydrogensulfite, sodium disulfite, sodium thiosulfate, sodium hypophosphite, phosphorous acid, mercaptopropionic acid, mercaptoacetic acid, mercaptoethanol, alkali metal salts of said acids or mixtures of said polymerization regulators. The amounts of polymerization regulators used for the polymerization are for example from 0.1 to 10 wt % and preferably from 1 to 5 wt % based on the monomers used for the polymerization.

The water-free reaction product obtained in the course of the esterification can be polymerized. alone or preferably together with other monomers. The polymerization can be carried out continuously or batchwise. In a batch operation, for example, water is initially charged as a polymerization medium to a vessel equipped with mixing means, reflux condenser and water separator, and is heated to the polymerization temperature and, after polymerization lightoff, the esterification product and an initiator with or without a regulator are added continuously or batchwise. The polymerization can be carried out at atmospheric pressure, at superatmospheric pressure or else under reduced pressure. In all cases, it is carried out with the reaction mixture at the boil. According to the present invention, either all the entrainer used in the course of the esterification or—if a portion of the entrainer has already been removed beforehand—the portion of the entrainer that has remained in the polymerizable mixture is distilled azeotropically out of the reaction mixture during the polymerization and the distillatively removed water is recycled. However, the amount of distillatively removed water can also be replaced in the reaction mixture by addition of fresh water. This ensures that the concentration of water in the reaction mixture remains virtually constant during the polymerization. The entrainer used in the esterification reaction is distributed in the polymerization reactor over a relatively large area and therefore is rapidly removed from the system. The azeotrope is condensed and separated into two phases, and the aqueous phase is recycled or discarded. This ensures that the entrainer is distillatively removed from the polymerization reactor together with water as an azeotropic mixture at the rate at which the entrainer is metered into the polymerization zone together with the esterification product. The steady state concentration of entrainer in the polymerization reactor is therefore low and has no negative outworkings on the polymerization. The entrainer distillatively removed in the course of the polymerization can be reused in the esterification. If purification should be required, it can be purified for example by means of a liquid-liquid extraction with water. However, the entrainer can also be distilled or subjected to a steam distillation before being reused in the esterification reaction.

In the batch method described above, the monomers, the initiator and optionally the regulator can be fed to the reactor over a period of from 1 to 20 hours, preferably from 2 to 10 hours. On completion of the feed, the reaction mixture is polymerized for a further 0.1 to 10 hours, preferably a further 0.5 to 3 hours, for example. This post-polymerization is again preferably carried out with boiling of the reaction mixture. During this operation residues of entrainer can optionally be distilled off from the polymerization mixture. Following polymerization the content of organic solvent in the aqueous polymer solution is preferably less than 100 ppm. In the process of the invention it is even possible to remove the entrainer completely from the mixture produced by polymerization. The residual contents of entrainer in the polymerization solution are for example from 0 to 50 ppm, usually from 1 to 30 ppm.

In order to increase the space-time yield of the polymerization by quicker azeotropic distillation of the entrainer, it may be advantageous to introduce nitrogen or steam into the polymerization reactor. By this means the distillation rate of the azeotrope is raised.

If copolymers are to be manufactured containing polymerized units of a monoethylenically unsaturated carboxylic acid as comonomer, a base can be added before, during or after polymerization for neutralization. All alkali-reacting substances can be used, eg alkali metal oxides, alkali metal hydroxides, alkali metal carbonates, alkali metal hydrogencarbonates, magnesium oxide, calcium oxide, barium oxide, the corresponding alkaline earth metal hydroxides, aluminum hydroxide, iron hydroxide, iron oxide, ammonia and amines such as cyclohexylamine, dicyclohexylamine, butylamine, ethanolamine, diethanolamine, triethanolamine and morpholine. Preferably, sodium hydroxide is used in the form of from 10 to 50 wt % strength aqueous solutions for neutralization of the acid groups of the comonomers.

The polyalkylene glycol ethers terminated at one end by end groups and used during esterification can have a diol content of up to 5 wt %. The content of polyalkylene glycols in the polyalkylene glycol ethers terminated at one end by end groups is preferably in the range of from 0.1 to 3 wt %.

Alternatively, the copolymerization of the polyalkylene glycol ether esters of formula I, terminated at one end by end groups, can be effected with sulfo group-containing monomers such as sodium vinylsulfonate, 2-acrylamido-2-methylpropanesulfonic acid or methallylsulfonic acid for example. The sulfo group-containing monomers can optionally be co-used in admixture with other monomers such as acrylic acid or methacrylic acid for copolymerization of the esters of formula I. Further suitable comonomers for the compounds of formula I are eg vinyl acetate, styrene, $C_1$–$C_{25}$ alkyl (meth)acrylates, vinylpyrrolidone, acrylamide, methacrylamide, hydroxyalkyl (meth)acrylates such as hydroxypropyl methacrylate, hydroxyethyl acrylate, hydroxyethyl methacrylate and glycidyl methacrylate.

In the process of the invention aqueous polymer solutions are obtained which contain either no organic solvent or only small amounts of organic solvent. The space-time yield achieved in the process of the invention is considerably higher than that obtained in the process described in EP-A 0,884,290 for a comparable grade of product. The polymers obtainable by the process of the invention are excellent concrete plasticizers. In the present invention, polymerization may also be carried out at higher concentrations without lowering the performance of the polymers as concrete plasticizers. The concentration of the polymers in the reaction mixture can be up to 70 wt %. Usually aqueous polymer solutions having concentrations of from 30 to 60 wt % are prepared.

The percentages given in the examples are by weight. The conversion during esterification was determined by NMR spectroscopy. The K value of the polymers was determined in aqueous solution at a pH of 7, a temperature of 25° C. and a polymer concentration of the sodium salt of the copolymer of 1 wt % according to H. Fikentscher, Cellulose-Chemie, Volume 13, 58–64 and from 71 to 74 (1932).

Ester 1

478 g (0.478 mol) of methyl polyethylene glycol having a molecular weight of 1000, 167 g (1.94 mol) of methacrylic acid, 1.9 g of a 50% strength aqueous hypophosphorous acid, 0.08 g of phenothiazine, 4.1 g of p-toluenesulfonic acid and 130 g of toluene were placed in a reactor having a capacity of 2 liters and equipped with a gas inlet tube and water separator and heated to a temperature of 130° C. for a period of 13 hours while passing nitrogen therethrough. The resulting water was separated in the water separator and the toluene recirculated to the reactor. The acid value of the reaction mixture was 114 mg KOH/g, and the conversion of methyl polyethylene glycol was 95%.

Ester 2 was prepared as for ester 1 but with the sole exception that 19.5 g of p-toluenesulfonic acid were used. The acid value of the reaction mixture was 130 mg KOH/g, and the conversion of methyl polyethylene glycol was 97%.

Ester 3 was prepared as for ester 1, but with the exception that 123 g (1.43 mol) of methacrylic acid were used. The acid value of the reaction mixture was 78 mg KOH/g and the conversion of methyl polyethylene glycol was 95%.

Ester 4 was prepared as for ester 1 except that 82 g (0.96 mol) of methacrylic acid were used. The acid value of the reaction mixture was 55 mg KOH/g and the conversion of methyl polyethylene glycol was 96%.

EXAMPLE 1

In a reactor having a capacity of 2 liters and equipped with metering means, gas inlet tube and a water separator with reflux condenser 583 g of water were boiled under reflux whilst constantly passing nitrogen through and streams were simultaneously fed in over a period of 6 hours from 3 feeds whilst maintaining the reflux conditions. Feed stream 1 comprised 590 g of ester 1, feed stream 2 comprised a solution of 7.4 g of sodium peroxodisulfate in 86 g of water and feed stream 3 comprised a solution of 17 g of sodium hypophosphite in 12 g of water. The toluene distilling off while feeding in stream 1 was separated in the water separator. The simultaneously separated water was recycled to the reactor. On completion of metering the reaction mixture was further polymerized over a period of 2 hours. Following post-polymerization the reaction mixture was cooled and then neutralized by the addition of 85 g of 50% strength aqueous sodium hydroxide solution. The solids content of the reaction mixture was 40% and the K value of the copolymer was 30.6. The residual content of toluene was less than 10 ppm.

The content of unesterified methyl polyethylene glycol was 5% based on the polymer.

EXAMPLE 2

Example 1 was repeated except that a solution of 17 g of sodium disulfite in 26 g of water was used instead of the sodium hypophosphite solution. The solids content of the polymer solution was 40% and the K value of the polymer was 30.0. The residual content of toluene was less than 10 ppm. The content of unesterified methyl polyethylene glycol was 5% based on the polymer.

EXAMPLE 3

Example 1 was repeated except that 590 g of ester 2 were used. The solids content of the polymer solution was 40% and the K value of the polymer was 29.9. The residual content of toluene was less than 10 ppm. The content of unesterified methyl polyethylene glycol was 3% based on the polymer.

EXAMPLE 4

Example 1 was repeated except that 446 g of water were used as initial batch. Following polymerization and neutralization there was obtained a polymer solution having a solids content of 50 wt %. The copolymer had a K value of 30.9. The residual content of toluene in the reaction mixture was less than 10 ppm. The content of unesterified methyl polyethylene glycol was 5% based on the polymer.

EXAMPLE 5

Example 1 was repeated except that 590 g of ester 3 were used. Following neutralization with 38 g of 50% strength aqueous sodium hydroxide solution there was obtained a polymer solution having a solids content of 40%. The copolymer had a K value of 29.5. The content of unesterified methyl polyethylene glycol was 3% based on the polymer.

EXAMPLE 6

Example 5 was repeated except that 590 g of ester 4 were used. Following neutralization with 20 g of 50% strength aqueous sodium hydroxide solution there was obtained a polymer solution having a solids content of 40%. The copolymer had a K value of 25. The content of unesterified methyl polyethylene glycol was 4% based on the polymer.

EXAMPLE 7

Example 1 was repeated except that at the same time as the unchanged feed streams for ester and sodium peroxodisulfate solution, 5 g of sodium bisulfite were dissolved in 20 g of water and simultaneously 85 g of 50% strength sodium hydroxide solution were metered in. Following continuation of polymerization for a further 1 hour the reaction mixture was cooled to room temperature. The solids content of the polymer solution was 40% and the pH was 6.7. The copolymer had a K value of 27.

The copolymers prepared according to Examples 1 to 4 were tested for their dispersive action by the mortar test as specified in DIN 1164 or EN 196.

The results obtained are listed in the following table.

TABLE

| | Extent of spread in cm of a mortar mixture as specified in DIN 1164 | | | |
|---|---|---|---|---|
| | after 1 minute | after 30 minutes | after 60 minutes | after 90 minutes |
| Example 1 | 21.1 | 18.6 | 17.2 | 16.4 |
| Example 2 | 21.1 | 19.0 | 17.5 | 16.5 |
| Example 3 | 20.7 | 17.9 | 16.7 | 16.1 |
| Example 4 | 20.8 | 18.5 | 17.0 | 16.2 |

The plasticizing action of the polymers on a mortar mixture is demonstrated in the table with reference to the extent of spread after 1, 30, 60 and 90 minutes.

Amounts used:

500 g of cement HD CEM J 32.5 R
1350 g of CEN standard sand
225 g of drinking water
polymer:

0.15% calculated as solids based on the quantity of cement used; ie 0.75 g of polymer.
defoaming agent:

0.35% based on the amount of plasticizer used

What is claimed is:

1. A process for the preparation of water-soluble polymers of esters of ethylenically unsaturated carboxylic acids and polyalkylene glycols by azeotropic esterification, in the presence of organic solvents which form an azeotrope with water, of ethylenically unsaturated carboxylic acids with polyalkylene oxides which are capped at one end by end groups, to a degree of at least 85 wt %, followed by free-radical polymerization of the resulting esters optionally together with other ethylenically unsaturated monomers, in aqueous medium, wherein the organic solvents are removed by azeotropic distillation from the reaction mixture during polymerization and the water that is removed by distillation is recycled or the quantity of water removed by distillation from the reaction mixture is replaced by a feed of fresh water.

2. A process as defined in claim 1, wherein the content of organic solvent in the monomer solution is up to 30 wt %.

3. A process as defined in claim 1, wherein the content of organic solvent in the monomer solution is from 1 to 5 wt %.

4. A process as defined in claim 1, wherein
(a) esters of the formula

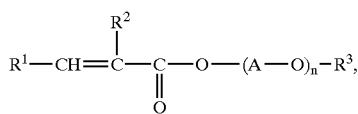 (I)

in which
R$^1$, R$^2$ are the same or different and denote H or CH$_3$
A is an alkylene group containing from 2 to 4 carbons or is —CH$_2$—CH$_2$—CH$_2$—CH$_2$—,
R$^3$ stands for C$_1$–C$_{50}$ alkyl or C$_1$–C$_{18}$ alkylphenyl and
n is a number from 2 to 300, are copolymerized with
(b) at least one monoethylenically unsaturated carboxylic acid or salts thereof.

5. A process as defined in claim 4, wherein the monomers (a) and (b) are copolymerized in a ratio, by weight, of from 98:2 to 2:98.

6. A process as defined in claim 1, wherein
(a) acrylates or methacrylates of polyalkylene glycols capped at one end by C$_1$–C$_4$ alkyl end groups and having molecular weights of from 100 to 10,000 are copolymerized with
(b) acrylic acid and/or methacrylic acid.

7. A process as defined in claim 1, wherein
(a) esters of methacrylic acid and methyl polyethylene glycol having molecular weights of from 100 to 10,000 are copolymerized with
(b) methacrylic acid.

8. A process as defined in claim 1, wherein copolymerization is carried out in the presence of from 0.1 to 10 wt % of a polymerization regulator.

9. A process as defined in claim 8, wherein the polymerization regulators used are sodium hydrogensulfite, sodium disulfite, sodium thiosulfate, sodium hypophosphite, phosphorous acid, 2-mercaptoethanol, mercaptopropionic acid, mercaptoacetic acid, alkali metal salts of said acids or mixtures of said polymerization regulators.

10. A process as defined in claim 1, wherein the acid groups of the polymers are at least partially neutralized with bases during or after polymerization.

* * * * *